(12) United States Patent
Abergel et al.

(10) Patent No.: US 11,113,590 B2
(45) Date of Patent: *Sep. 7, 2021

(54) DEVICE AND METHOD FOR OPTIMISING TRANSFORMATION BY DIGITAL PROCESSING OF A SUBSTRATE

(71) Applicant: MGI Digital Technology, Fresnes (FR)

(72) Inventors: Edmond Abergel, Paris (FR); Leo Paviotti, Antony (FR); Romain Poncet, Antony (FR)

(73) Assignee: MGI Digital Technology, Fresnes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,164

(22) Filed: Apr. 23, 2020

(65) Prior Publication Data

US 2020/0250500 A1 Aug. 6, 2020

Related U.S. Application Data

(63) Continuation of application No. 15/748,396, filed as application No. PCT/EP2016/067763 on Jul. 26, 2016, now Pat. No. 10,671,899.

(30) Foreign Application Priority Data

Jul. 31, 2015 (EP) .................................... 15290198

(51) Int. Cl.
*H04N 1/387* (2006.01)
*G06K 15/02* (2006.01)
*B41J 3/407* (2006.01)
*B41J 11/42* (2006.01)

(52) U.S. Cl.
CPC .......... *G06K 15/1868* (2013.01); *B41J 3/407* (2013.01); *B41J 11/42* (2013.01); *G06K 15/186* (2013.01); *G06K 15/1893* (2013.01); *H04N 1/3878* (2013.01); *G06K 15/1856* (2013.01)

(58) Field of Classification Search
CPC ........... G06K 15/1868; G06K 15/1893; G06K 15/1856
USPC ......... 358/1.9, 1.2, 1.18; 715/221, 222, 223, 715/224, 225
See application file for complete search history.

(56) References Cited

U.S. PATENT DOCUMENTS 4,857,715 A ‡ 8/1989 Koch et al.
5,404,294 A    4/1995 Karnik
5,471,564 A * 11/1995 Dennis .................. G06F 3/1296
                                                     358/1.15

(Continued)

FOREIGN PATENT DOCUMENTS

JP    2002264462 A    9/2002
JP    2011090383 A ‡  5/2011

(Continued)

OTHER PUBLICATIONS

International Search Report (in English and French) and Written Opinion (in French) issued in PCT/EP2016/067763, dated Oct. 4, 2016; ISA/EPO.‡

*Primary Examiner* — Jamares Q Washington

(57) ABSTRACT

The present invention relates to a device for transforming by digital processing a substrate and preferably a pre-processed substrate. The present invention also relates to a method for transforming by digital processing a substrate, preferably a pre-processed substrate.

17 Claims, 2 Drawing Sheets

(56) References Cited

U.S. PATENT DOCUMENTS

| | | | | |
|---|---|---|---|---|
| 5,813,771 | A * | 9/1998 | Ur | B41J 13/26 |
| | | | | 400/68 |
| 5,930,469 | A * | 7/1999 | Chiarabini | G06F 3/1297 |
| | | | | 358/1.17 |
| 6,205,452 | B1 * | 3/2001 | Warmus | G06F 40/10 |
| | | | | 715/246 |
| 6,820,526 | B1 * | 11/2004 | Maddalon | B26D 5/34 |
| | | | | 83/210 |
| 10,671,899 | B2 * | 6/2020 | Abergel | B41J 11/42 |
| 2005/0275702 | A1 * | 12/2005 | Silverbrook | B41J 15/22 |
| | | | | 347/101 |
| 2011/0075193 | A1 * | 3/2011 | Kumamoto | G03G 15/5062 |
| | | | | 358/1.15 |
| 2013/0176590 | A1 * | 7/2013 | Shiraishi | H04N 1/415 |
| | | | | 358/1.15 |
| 2014/0126000 | A1 ‡ | 5/2014 | Chong et al. | |
| 2015/0116747 | A1 * | 4/2015 | Hakamada | G06K 15/1852 |
| | | | | 358/1.13 |

FOREIGN PATENT DOCUMENTS

WO    WO-2009047757 A2 ‡    4/2009
WO    WO-2014125391 A1 ‡    8/2014

\* cited by examiner
‡ imported from a related application

DEVICE AND METHOD FOR OPTIMISING TRANSFORMATION BY DIGITAL PROCESSING OF A SUBSTRATE

CROSS REFERENCE TO RELATED APPLICATIONS

This application is a continuation of U.S. patent application Ser. No. 15/748,396 filed on Jan. 29, 2018, which is a U.S. National Phase Application under 35 U.S.C. 371 of International Application No. PCT/EP2016/067763 filed on Jul. 26, 2016 and published in French as WO 2017/021209 A1 on Feb. 9, 2017. This application claims priority to European Application No. 15290198.9 filed on Jul. 31, 2015. The entire disclosures of all of the above applications are incorporated herein by reference.

The present invention relates to a device for the digital transformation of a substrate, in particular a device for optimizing digital printing on a substrate, preferably a pre-processed substrate.

The present invention also relates to a method for the digital transformation of a substrate, in particular a method for optimizing digital printing on a substrate, preferably a pre-processed substrate.

Problems of substrate deformation and/or imperfect conveying of the substrate before and/or during printing are well known to those skilled in the art. As an illustration, a shift in the direction of motion of the substrate and/or perpendicular to the direction of motion of the substrate and/or a bias and/or a stretching and/or a contraction may be cited. These problems have also been encountered by the Applicant, especially when developing her method for digital printing by varnish (or ink) on previously printed substrates. To solve these problems, more and more sophisticated substrate conveying devices have been developed by the Applicant. As an illustration, there are numerous mechanical systems, sensors and cameras with ever higher performance which bring an improvement in registration; unfortunately, these ever-finer adjustments considerably reduce production capacities. In the literature there are also numerous devices for aligning the substrate to improve substrate motion. An additional problem lying in the use of these sophisticated substrate conveying devices is that they are very highly technical, requiring the virtually permanent presence of technical experts while being used, resulting in prohibitive operating costs. Furthermore, despite this sophistication, the Applicant has observed that the problems mentioned above were still not solved and that there exists a need in this area. The Applicant has indeed observed infinitesimal shifts in ink depositing (for example, a varnish) deposited selectively by means of digital printing on pre-processed areas of a substrate (for example, a pre-printed image or part of an image) and this occurs whatever ideal and so-called foolproof conveying system is used. As an illustration there can be a transverse and/or longitudinal shift of the image, a homothetic transformation of the image, etc.

As this additional problem can arise from the pre-processing of the substrate (for example the positioning of the image), there therefore exists an additional need to solve it.

WO2009047757 claims a system for overprinting a substrate comprising a quantity of registration marks and at least one pre-printed feature; the system comprising: an imager to capture a digital image of the said substrate with the said registration marks; a printing platform on which the substrate lies during overprinting; a controller connected operationally to the said imager and to the printing mechanism; in which the said controller is adapted to determine and evaluate the displacement of the said pre-printed feature on the basis of the said substrate image received from the said imager, and to estimate a compensatory or corrective deviation of the correlation to apply electronically to the image being overprinted. Using information on this compensatory or corrective deviation contained in the controller, the latter can act directly on—and therefore control—the printing mechanism to compensate this deviation. There are several drawbacks to this technique, starting with the obligatory need for registration marks to be positioned at predetermined places and at least one pre-printed feature on the substrate. There is also the fact that the whole of the pre-printed substrate must be digitized before beginning the overprinting step, in order to send the necessary information on the positioning of the printing mechanism.

The present invention therefore aims to address these major drawbacks in the earlier process.

This aim is achieved by a device for the digital processing of a substrate, preferably a pre-processed substrate, comprising:
  a station for transforming a substrate by digital processing,
  a control station controlling the transformation station,
  a digital source FN1 file representing the substrate,
  a digital FN3 file representing the transformation to perform on the substrate,
  a substrate analysis X device to assign numerical values to it,
  a digital FN2 file representing the substrate analyzed by means of the X device and the acquisition of corresponding digital data,
characterized in that:
  the control station contains the digital FN1, FN2 and FN3 files together with
    a means of comparing and recording the differences between the FN1 file and the FN2 file,
    a means of correcting the FN3 file by the differences between the FN1 file and the FN2 file, and
    a digital FN3-CORR file supplied by the means for correcting the FN3 file and which replaces the FN3 file for the transformation.

Any device for the digital transformation of a substrate can benefit from the advantages of the present invention. For purely illustrative purposes, the device for the digital transformation of a substrate is selected from among cutting devices (for example laser cutting), finishing devices, printing devices, etc., which require there to be within the said transformation device at least one station for transforming a substrate by digital processing selected from among the cutting stations (for example laser cutting), finishing stations, printing stations, etc.

In particular, the present invention concerns a device for the printing of a substrate, preferably a pre-processed substrate, comprising:
  a station for the digital printing of the substrate,
  a control station controlling the printing station in particular,
  a digital source FN1 file representing the substrate,
  a digital FN3 file representing the printing to perform on the substrate,
  a substrate analysis X device to assign numerical values to it,
  a digital FN2 file representing the substrate analyzed by means of the X device and the acquisition of the corresponding digital data, characterized in that:
the control station contains the digital FN1, FN2 and FN3 files together with
a means of comparing and recording the differences between the FN1 file and the FN2 file,
a means of correcting the FN3 file by the differences between the FN1 file and the FN2 file, and
a digital FN3-CORR file supplied by the means for correcting the FN3 file and which replaces the FN3 file for printing.

Among the preferred printing materials according to the present invention, we cite for purely illustrative purposes inks and/or varnishes. For purely illustrative and non-restrictive purposes, these inks/varnishes may be functional, for example by color, security, conducting and/or luminescent properties.

According to certain embodiments of the present invention, the substrate is pre-processed in a pre-processing device which is preferably different from the transformation device.

According to certain embodiments of the present invention, the transformation device also contains a substrate conveying station. As an illustration, the conveying station conveys the substrate from the entry of the transformation device up to the exit of the transformation device.

As an illustration, the conveying station conveys the substrate across the pre-processing device and then across the transformation device.

According to certain embodiments of the present invention, the transformation device also contains
an entry magazine (for storing the substrates before transformation), and/or
an exit magazine (for storing the substrates after transformation), and/or
a means for the digital control of operations on each of the work stations, and/or
a means of conveying the substrate between the various work stations and/or
a means for grabbing and/or conveying the substrate from the entry magazine to the exit magazine and/or
a transformation station, for example a printing station composed for illustrative purposes of at least one nozzle controlled by the control station, and fed by a reservoir containing the product to spray on to the substrate, and/or
a drying station containing, for example, an infrared and/or near infrared and/or a heated air flow drying oven and/or a UV lamp and/or a UV LED drying and/or a photonic method (for example a photonic method using flash lamps providing wide spectrum light pulses (permanently adjustable), of several megawatts for several microseconds).

According to certain embodiments of the present invention, when a material A has been used for pre-processing a substrate, a different material B is then used to transform the substrate; thus, for purely illustrative and non-limiting purposes, material A may be an ink and/or a varnish and material B may be an ink different from A and/or a varnish different from A.

According to certain embodiments of the present invention, the control station is computer-based, for example a computer workstation. The characteristic of this control station according to the present invention is therefore that it can record the digital FN1, FN2 and FN3 files and provide the FN3-CORR file through the correction means contained in the control station, the said FN3-CORR file replacing the FN3 file and being used by the control station to perform the transformation.

According to certain embodiments of the present invention, the control station includes a parallelizable calculation/processing unit; the Applicant has discovered that the use of these parallelizable calculation/processing units improved the results of her transformation method. For illustrative purposes, this parallelizable calculation/processing unit can be a GPGPU (more commonly known as graphics card) and/or an FPGA.

According to certain embodiments of the present invention, the control station contains a sequential calculation/processing unit. For illustrative and non-limiting purposes, this sequential calculation/processing unit can be a quantum computer.

According to another particularity, the control station can also advantageously collect other information from among which, for purely illustrative purposes, the information from the various sensors of the transformation device is selected; for example, the sensors give information on the positions of the substrates, information on the speeds of motion of the substrates, information on the configurations of substrates, information on the means of movement of the substrates, information on the means of grabbing the substrates, and/or information on validation according to whether an operation has been properly carried out or not.

According to another particularity, the control station can also advantageously control other work stations among which are selected for purely illustrative purposes, electronic cards and/or PLCs, a printing station comprising, for example, a number of inkjet printheads controlled by computer means, a drying station, a substrate conveying station, a substrate cutting station and/or substrate analysis station and/or a combination of the two and/or several of the said stations cited above.

The substrates according to the present invention may be of variable nature, shape, thickness and dimensions. For illustrative and non-limiting purposes, we can cite sheets, rolls, boards, printed circuits, and/or any other 2- or 3-dimensional object, for example bottles, cubes, parallelepipeds, rectangles, etc. In terms of format, for non-limiting and purely illustrative purposes, there can be cited a format whose dimensions are of the order of a centimeter, for example an A10 type format, as a more precise example, a credit card type format up to a format with dimensions of the order of several meters, for example an A0 type format or a 2×2 meter format; up to a roll type format whose length may be several meters, tens of meters, hundreds of meters or even of the order of kilometers.

The substrate can be selected from among a large number of materials and not be considered as limited to the materials frequently used in standard printing and/or customizing devices such as paper, cardboard and plastic substrates. As non-limiting examples, we can cite rigid and/or flexible substrates. We can also cite as non-limiting examples metal, paper, textile, fabrics, non-woven, plastic, for example methacrylic copolymer, polyester, polyethylene, polypropylene, polystyrene and/or polyvinyl chloride, or even materials of the cellulose type such as wood, plywood, or crystalline materials such as glass or ceramics for example.

The invention therefore applies equally to any combination of these materials, such as complex materials comprising one or more of these components such as milk cartons.

According to certain preferred embodiments of the present invention, the substrate is therefore pre-processed. For purely illustrative and non-restrictive purposes, the pre-processing may be selected from the following list: printing (for example electrophotographic, offset, inkjet, etc.) an image and/or text, an image and/or text pasting, filing (often called laminating), pre-cutting (for example by laser), perforation, and/or a combination of several of the said pre-processing.

The present invention therefore also concerns a transformation method in a transformation device for transforming by digital processing a substrate, preferably a pre-processed substrate, comprising
- a step for the transformation by digital processing of a substrate in a transformation station of the transformation device,
- a step for the control of the transformation station by a means of control,
- a recording step in the means of control of a digital source FN1 file representing the substrate,
- a recording step in the means of control of a digital FN3 file representing the transformation by digital processing to carry out on the substrate,
- a step for the analysis of the substrate by means of a X device in order to assign numerical values to it, the said X device being located in the transformation device,
- a recording step in the means of control of a digital FN2 file representing the substrate analyzed by means of the X device and the acquisition of the corresponding digital data,
- a step for comparison and recording in the means of control of the differences between the FN1 file and the FN2 file,
- a step for the correction, by a means of correction that is part of the means of control, of the FN3 file by the differences between the FN1 file and the FN2 file, and
- a recording step in the means of control of a digital FN3-CORR file supplied by the means of correction of the FN3 file, the step for the transformation by digital processing of the substrate in a transformation station being the last step, said last step being controlled by the means of control by means of the FN3-CORR file.

In particular, the present invention therefore concerns a method for the printing of a substrate in a printing device, preferably a pre-processed substrate, comprising:
- a step for the digital printing of the substrate in a printing station of the printing device,
- a step for the control of the printing station by a means of control,
- a recording step in the means of control of a digital source FN1 file representing the substrate,
- a recording step in the means of control of a digital FN3 file representing the printing to carry out on the substrate,
- a step for the analysis of the substrate by means of a X device in order to assign numerical values to it, the said X device being located in the printing device,
- a recording step in the means of control of a digital FN2 file representing the substrate analyzed by means of the X device and the acquisition of the corresponding digital data,
- a step for comparison and recording in the means of control of the differences between the FN1 file and the FN2 file,
- a step for the correction, by a means of correction that is part of the means of control, of the FN3 file by the differences between the FN1 file and the FN2 file, and
- a recording step in the means of control of a digital FN3-CORR file supplied by the means of correction of the FN3 file, the step for the digital printing of the substrate in a printing station being the last step, the said last step being controlled by the means of control by means of the FN3-CORR file.

According to certain embodiments of the present invention, the same substrate can advantageously pass more than once (as an illustrative and non-limiting example 2 to 50 times) under the X device and the transformation station, thereby repeating the method according to the present invention. As an illustration, this multi-pass technique can for example improve the quality of the transformation (for example of printing) by only using a single transformation station; thus, on each pass, a FN3-CORR file will preferably be used which is different from or identical to the previous FN3-CORR file; this technique is therefore distinguished from overprinting techniques.

The terms "before" and "behind" are used in the present invention to indicate a time relation. As an illustration, before will be a synonym of "previously" and behind will be a synonym of "subsequently to".

The terms "upstream" and "downstream" are used in the present invention to indicate a spatial relation. As an illustration, upstream will be a synonym of "previous to" and downstream will be a synonym of "subsequent to". These terms will naturally be interpreted according to the respective context in which they are used.

The present invention therefore contains a step for recording in the means of control a digital source FN1 file representing the substrate. This digital source FN1 file can as an example be the digital file that was used to control the controller for the substrate pre-processing step—this is generally the case when it is the same operator who carries out the pre-processing and transformation steps or when the first operator sends the second operator the digital data corresponding to the substrate (pre-processed). This digital source FN1 file can also be a digital file obtained by an optional additional step comprising
- a step for the analysis of the substrate (preferably of the pre-processed substrate) by means of a W device to assign digital values to it, the said step taking place before the substrate analysis step by means of an X device, and
- a step for recording in the means of control a digital FN1 file representing the substrate analyzed by means of the W device and the acquisition of the corresponding digital data.

According to certain embodiments of the present invention, the W device is located upstream of the (preferably pre-processed) substrate conveying station which is located in the transformation device.

The W device can, for the purpose of illustration, also be located in the pre-processing device, between the pre-processing device and the transformation device, or else in the transformation device itself. Although the said W device is usually located upstream of the X device, the X device could also be used as the W device. As an illustration, we take a substrate (preferably pre-processed) with no defects and bring it to the W device in optimal fashion to analyze it and extract from it the source FN1 file which will therefore be used as a perfect theoretical file. This additional analysis step can advantageously be carried out through a meticulous check by an operator who selects the substrate (preferably pre-processed) with no defects which he identifies as perfect and analyses perfectly taking care to minimize anything that could affect the obtaining of a perfect source FN1 file; as an illustration, the operator will make sure that the conveying and/or positioning of the substrate in the W device is optimal to carry out their analysis (for example, by checking the substrate conveying speed and/or its inclination/angle).

The present invention can prove particularly useful when there is a large number of identical substrates to produce. Thus, and this is a specific embodiment of the present invention, the ratio between the number of files FN2 and the number of files FN1 used is greater than 10, preferably greater than 100, for example greater than 500, 1000, even greater than 10,000. In general, the comparison of the differences between the file FN1 and the FN2 file can be made advantageously between a single source FN1 file representing the number "N" of identical substrates (preferably pre-processed) to transform and the same number "N" of FN2 files; optionally, the same FN2 file can be used, "n" times for a number n of consecutive substrates to transform, "n" being a number between 1 and N, or between 1 and N/2 (for all N>2), preferably between 1 and N/10 (for all N>10), for example between 1 and N/100 (for all N>100)—in this way, the number of files FN2 is reduced, but the effectiveness of the present invention is also reduced; when the calculation of "n" gives a number which is not a whole number, it will be rounded to the next higher or lower whole number. A particular embodiment when the source FN1 file comes from the W device consists in using a number "q" of files FN1 for the number "N" of identical substrates (preferably pre-processed) to transform; as an illustration, when a very large number "Q" of substrates, assumed to be identical, are to be transformed, it can happen that not all the substrates are absolutely identical, and that "q" files FN1 should be established, enabling each FN1 file to be compared to a set "Q/q" of files FN2; for example, when Q is equal to 500, 10 files FN1 could be established at regular intervals every 50 substrates. As an illustration, for all Q>100, q must be equal to or greater than 1, than 2, than 5 or even than 10, and/or equal to or less than Q, than Q/2, than Q/5 or even than Q/10.

The present invention can also prove particularly useful when successive substrates are different and/or when the substrate is a roll with different pre-processing. As an illustration, we can cite the customizing technique, for example of labels for wine and/or other drinks for which a part at least of the pre-processing differs along the roll. In this precise case, either a single overall FN1 file supplied by the pre-processing specialist could be introduced, the said FN1 file being representative of all the substrates and/or the roll, or one could introduce several files FN1 supplied by the specialist responsible for the pre-processing of the said files FN1, each one being representative of only a part of all of the substrates and/or only a part of the roll.

According to certain embodiments of the present invention, the relative movement of the substrate with respect to the transformation device can be by any appropriate method. As an illustration, the substrate is either moved by means of a conveying station through a transformation station, or the substrate remains immobile and it is the transformation station which moves, or else the substrate and the transformation station both move. The same will be true for the relative movement of the substrate with respect to the X (and/or W) device. As an illustration, the substrate is either moved by means of a conveying station through the X (and/or W) device, or the substrate remains immobile and it is the X (and/or W) device which moves, or else the substrate and the X (and/or W) device both move.

Thus, according to the present invention, the X device is located in the transformation device, for example upstream of the transformation station or downstream of the transformation station according to the movement of the substrate.

Any device for the analysis and acquisition of digital data representing the substrate can be used advantageously as W or X device. According to certain embodiments of the present invention, the W and X devices are acquisition systems (for example, a scanner, a flatbed scanner, a sheet-fed scanner and/or a drum scanner) and/or video cameras. In a particular embodiment of the present invention, the resolution of the X device is identical to the resolution of the W device, the said resolution usually being expressed in "dots per inch" or "pixels per inch".

The present invention therefore includes—before the transformation step—a step for the analysis of the substrate by means of an X device in order to assign numerical values to it, the said X device being located in the transformation device, and a step for recording a digital FN2 file in the means of control representing the substrate analyzed by means of the X device and the acquisition of the corresponding digital data.

The differences between the FN1 file and the FN2 file are therefore critical within the spirit of the present invention. As explained below in the description of the algorithm, the nature of these differences can also prove critical. Although the present invention may prove useful for correcting defects in the pre-processing of the substrate, the first objective of the present invention is to ensure that the transformation of the substrate by digital processing (for example, digital printing) is optimized, for example that the positioning of the said transformation of the substrate follows the local or overall deformations of the substrate and/or its pre-processing.

In theory, the information in the digital FN3 file contained in the means of control of the transformation station are sufficient to perform the transformation of the substrate. In practice, it is observed that the theoretical substrate is not perfect, whether in the first treatment which can for example reveal infinitesimal and highly local displacements of certain features of the first treatment, or in the substrate as such, for example if the substrate has undergone local deformations, whether these be due either to the nature and/or the quality of the substrate, or the imperfect positioning if the substrate in the conveying station. The present invention therefore addresses these drawbacks by acting directly on the digital transformation file (for example the digital printing file "FN3"). This already represents a considerable advantage of the present invention in comparison with techniques described in the literature. An additional advantage of the present invention is that it is possible to start the transformation by means of the FN3 file-CORR in strips before receiving the whole of the information contained in the FN2 file. Among other things, this enables substrate processing to be started before it is completely digitized by the X device. Strip data management by FN2 (management by continuous data stream) brings a considerable advantage to the distance between the X device and the substrate transformation method and therefore on the dimensions of the transformation device. This also provides the possibility of processing large size substrates (several meters or even hundreds of meters for substrates in rolls).

The term digital file is well known to those skilled in the art, for whom the term is equivalent to the term computer file (sometimes also called digital document). Technically, a digital file is very often digital information composed of a sequence of bytes, i.e. a sequence of numbers which can be used in a variety of ways. As an illustration, a digital file is composed of zeros and ones and is usually defined as a structured sequence of data (often in the form of a list of recordings in the same format), bearing a name and code on a support. In general, information is called digital when it is presented in the form of numbers associated with an indication of the quantity to which they apply, enabling calculations, statistics and the verification of mathematical models.

In the everyday meaning, a computer file is a collection of digital information gathered together under a single name, recorded on a permanent storage support called mass storage, such as a flash memory, a USB drive, a RAM (DRAM/SRAM/DPRAM/VRAM/eDRAM/1T-SRAM/etc.), a memory card (CF/MMC/MS/SD (miniSD/microSD)/xD/XQD/etc.)/SmartMedia/Hard disk/Optical disk (CD/DVD/Blu-ray/etc.) and/or a magnetic tape, and handled as a unit.

The invention, with its features and advantages, will become clearer on reading the description below to which the two appended figures below refer.

Figure 1:
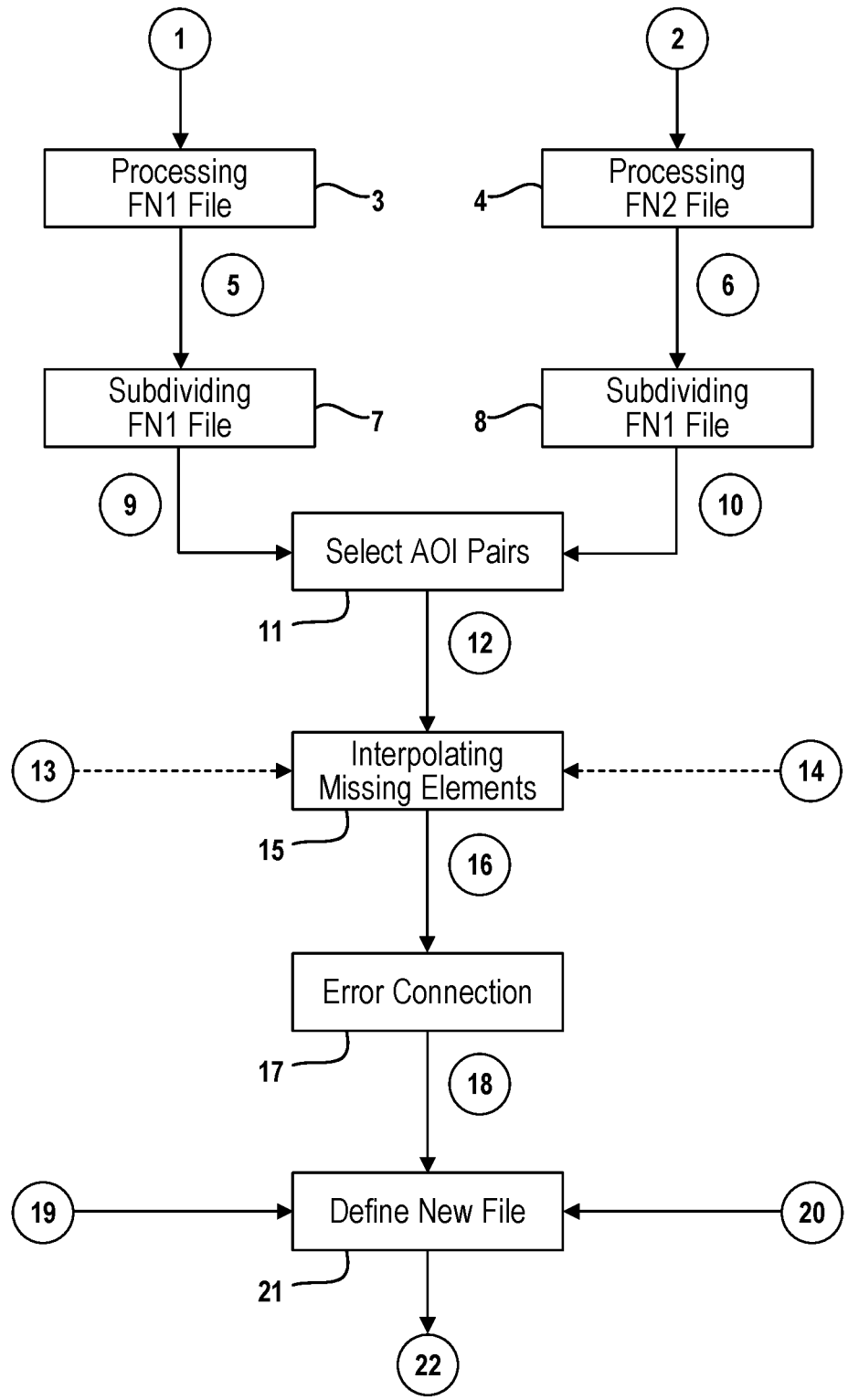
FIG. 1 illustrates a method operation algorithm for the transformation of a substrate by digital processing according to the present invention.

Therefore, for illustrative and non-limiting purposes, FIG. 1 illustrates a method operation algorithm for the transformation of a substrate by digital processing according to the present invention. Numerous steps related to this algorithm are optional; these steps and/or optional features can therefore advantageously be used individually or in combinations of two or more of the said options, according to the particular embodiments of the present invention.

The numbering used in the following description corresponds to the numbering of items in FIG. 1.

At 1 is the digital source FN1 file representing the substrate. As already indicated, this digital source FN1 file may, as an example, be the digital file that was used to control the substrate pre-processing step and/or a digital file obtained by an additional step comprising
- a step for the analysis of the substrate (preferably pre-processed) by means of a W device to assign digital values to it, the said step taking place before the substrate analysis step by means of an X device, and
- a recording step in the means of control of a digital FN1 file representing the substrate analyzed by means of the W device and the acquisition of the corresponding digital data.

At 2 is a digital FN2 file representing the substrate analyzed by means of the X device and the acquisition of the corresponding digital data.

Step 3 is an optional processing step for FN1 file. For illustrative and non-limiting purposes, this step may be intended to modify the resolution of FN1 file and/or modify the colorimetric space of FN1 file to match more closely the actual color of the pre-processed substrate. As an example, if the digital source FN1 file is used during pre-processing for color printing by means of a color printer having its own colorimetric space, this step 3 will enable the colorimetric space of file FN1 to be transformed into the colorimetric space of the color printer. After this optional step, the digital FN1 file therefore becomes processed digital FN1' file which can be seen in position 5 in FIG. 1 which we shall continue to call FN1 in the next part of the description so as to facilitate understanding.

According to certain embodiments of the present invention, in the case of the figure described where the digital FN1 file is obtained by means of the W device (the analysis and digital data acquisition device described above in the description), an optional additional step for processing the FN1 file is also possible. This step (not shown in the figure) is intended to modify the FN1 file according to the various features and/or defects of the W device. As examples, it may be the position of the W device, its angle relative to the movement of the substrate, the noise that it generates, resolution defects due to focal distance, etc. After this optional step, the digital FN1 file therefore becomes processed digital FN1" file which we shall continue to call FN1 in the next part of the description so as to facilitate understanding.

Step 4 is an optional processing step for the FN2 file. For illustrative and non-limiting purposes, this step is intended to modify the FN2 file according to the various features and/or defects in the X device (the digital data analysis and acquisition device described above in the description). As examples, it may be the position of the X device, its angle relative to the movement of the substrate, the noise that it generates, resolution defects due to focal distance, etc. After this optional step, the digital FN2 file therefore becomes processed digital FN2' file (which can be seen in position 6 in figure) which we shall continue to call FN2 in the next part of the description so as to facilitate understanding.

Step 7 is a specific embodiment of the present invention wherein a method is described for subdividing the FN1 file into portions, this subdivision enabling the subsequent comparison between the FN1 file and the FN2 file to be optimized. As an illustration, this step consists in subdividing the FN1 file into portions according to their interest; in this step, therefore, FN1 is subdivided into small portions (which we shall call "mesh elements" in the following description). The control station algorithm will calculate the variations in each of these mesh elements between FN1 and FN2. The choice of mesh size is important since the larger the mesh element, the less precise the algorithm (since fewer transformations are calculated over a given surface) and vice-versa. Once the file has been subdivided, this step creates a list of areas of interest ("AOI"); the AOI defines a mesh element with its X and Y positions (in Cartesian coordinates, for example in a plane system of Cartesian coordinates which could also be three dimensional by adding the Z coordinate) in the digital file and also contains a descriptor to identify the mesh element. It is also preferable for the mesh element not to be too small, since too small a mesh element makes it difficult to create the identifying descriptor for this mesh element. In the event that a robust descriptor cannot be created for a mesh element, then no AOI will be assigned to it and it will be ignored in the subsequent processing. A mesh element descriptor may for example be defined in a non-limiting way by the angles contained in this mesh element, its edges, color variations, etc. The robustness of a descriptor can be defined as its probability of uniqueness and its tolerance to transformations such as, and not limited to, stretching transformations, angular transformations and/or color transformations. On completion of step 7, the FN1 file has therefore been subdivided into a list of AOIs (shown in position 9 in the figure).

Step 8 is a specific embodiment of the present invention wherein a method is described for subdividing the FN2 file into portions ("mesh elements"), the said subdivision enabling the subsequent comparison between the FN1 file and the FN2 file to be optimized. This subdivision into mesh elements can be identical to the subdivision carried out in step 7 and/or the mesh element dimensions can be greater or smaller than the dimensions of the mesh elements in step 7.

This latter particularity can enable mesh elements to be matched together. Step 7 and step 8 can be carried out simultaneously or one before the other.

Step 11 is a specific embodiment of the present invention wherein the selection of AOI pairs from lists is described. In this step, each AOI from FN1 can be matched with an AOI from FN2 (or vice-versa). Matching is defined by the similarity between the descriptors of pairs of two AOIs, one from FN1 and the other from FN2 (or vice-versa). In the specific case where an AOI from FN1 is very similar to several AOIs from FN2 (or vice-versa), the control station algorithm will preferentially reject the corresponding mesh element since the error rate will be considered as too high. In a specific embodiment of the present invention, and in order to increase the performance of the algorithm, an AOI from FN1 will only be compared to AOIs from FN2 (or vice-versa) in a zone called "search zone". By searching within the search zone, the calculation time is reduced, and also any incoherencies related to image repetitions are avoided. On completion of step 11, we therefore obtain a list of AOI pairs (shown in position 12 in the figure) matched between FN1 and FN2. For each AOI pair, the separation in their positioning (between AOI-FN1 and AOI-FN2) identifies the differences (in X and Y) between FN1 and FN2.

As already stated in this description, a considerable advantage of the present invention is that it enables the steps of subdivision (meshing) and matching of the AOIs on parts of the substrate. Thus, and this is a specific embodiment of the present invention, the subdivision is carried out in successive transverse strips of the substrate (relative to the direction of movement of the substrate towards the transformation station). With this procedure, the transformation of the substrate in transverse strips can be started according to the transverse strips of substrate already analyzed in accordance with the present invention; thus, as a non-limiting illustration, printing of the first strips (located upstream of the substrate relative to the displacement of the substrate relative to the transformation station) can advantageously begin while part of the said substrate has not yet been analyzed by means of the X device.

Thus, according to a specific embodiment of the present invention, the digital files FN1 and FN2 are in fact composed of a multitude of digital files representing parts of the substrate, the said parts preferentially being successive strips, preferably successive transverse strips of the said substrate (i.e. strips perpendicular to the longitudinal axis in the plane of the displacement path relative to the substrate with respect to the transformation station, for example in the plane of movement of the substrate). According to a specific embodiment of the present invention, these strips have length dimensions equal to (or greater than) the width of the substrate, and/or width greater than 0.01 cm, than 0.05 cm, than 0.1 cm, than 0.5 cm, than 1 cm, or even greater than 5 cm, and/or width less than 100 cm, than 60 cm, than 30 cm, or even less than 10 cm.

According to a specific embodiment of the present invention, when the invention is applied by parts of the substrate (for example transverse strips), the list of AOI pairs (shown in position 12 in the figure) that match between FN1 and FN2 only therefore concerns part of the substrate. According to a specific embodiment of the present invention, positions 13 and 14 in the figure represent lists of matching AOI pairs between FN1 and FN2 and concern respectively the previous part and the next part of the substrate.

As an illustration, to compile the FN2 file representing strip "n" of the substrate, the control station uses the results of the analysis of strip "n" carried out by the X device and the corresponding acquisition of digital data. In a specific embodiment of the present invention, the computer station also uses the results of the analysis of strips located upstream (with respect to the relative displacement of the substrate with respect to the transformation station) of strip "n", for example strips "n−1", "n−2", "n−3", etc., carried out by the X device and the acquisition of the corresponding digital data; in an embodiment of the present invention, the computer station also uses the results of the analysis of the strips located downstream (with respect to the relative displacement of the substrate with respect to the transformation station) of strip "n", for example strips "n+1", "n+2", "n+3", etc., carried out by the X device and the acquisition of the corresponding digital data.

Step 15 is thus an optional embodiment of the present invention which describes a step for interpolating missing mesh elements. It can happen that during the previous steps certain mesh elements could not find a match between FN1 and FN2. The purpose of this step is therefore to interpolate the position of a missing mesh element as a function of known mesh elements. In the case where FN2 defines a part of the substrate, this step can take into account the analysis of the previous parts of the substrate and also the subsequent parts of the substrate which have already been digitized by the acquisition system in order to improve the interpolation precision. Thus, according to this complementary specific embodiment of the invention, position 16 in the figure represents lists of pairs of matching AOI between FN1 and FN2 and which are obtained on completion of step 15; at this stage of the algorithm and following the interpolation of step 15, all the missing mesh elements of FN1 and FN2 will have been determined.

Step 17 is an optional processing step which allows to take into account mesh element variations. As an illustration, this step can correct and smooth detection errors or errors in the interpolation of the position of mesh elements. A non-limiting example is the use of Bezier curves, or low pass filters. On completion of this optional mesh element smoothing step, matching pairs of mesh element positions between FN1 and FN2 are obtained (shown in position 18 in the figure).

The digital transformation FN3 file (for example of printing) is represented at position 19 in the figure.

The digital FN3-CORR file supplied by the means of correction of the FN3 file (which it replaces) and which is used by the control station to control the printing, is represented at position 22 in the figure.

Step 21 is a specific embodiment of the present invention which in fact describes the correction step, by a means of correction of the FN3 file that is part of the means of control, by the differences between the FN1 file and the FN2 file, and the step for recording in the means of control a digital FN3-CORR file supplied by the means of correction of the FN3 file. This step 21 defines a new digital file (FN3-CORR) representing the (part of the) transformation to be carried out (for example of (part of) the printing) according to the differences calculated during steps 11/12 and/or 15/16 and/or 17/18.

Position 20 represents an optional specific embodiment of the present invention which consists in reconstructing, from an empty digital file large enough to contain all the digital and transformation data (and preferably equal to the printing width) the digital FN3-CORR file representing the (part of the) transformation according to FN3 and the differences calculated during steps 11/12 and/or 15/16 and/or 17/18. This step copies the data of the digital FN3 file, applying to them the said differences in an empty digital file large enough to contain all the data (and preferably equal to the printing width).

As already stated in this description, a considerable advantage of the present invention consists in not having to add registration marks at predetermined places on the substrate. However, it is obvious that adding the said registration marks is not prohibited, but it does represent additional complexity not preferred according to the present invention since it needlessly adds to the weight of the files FN1 and FN2. Thus, according to a specific embodiment of the present invention, the substrate does not contain registration marks at predetermined places; for example, the substrate does not contain registration marks.

The resolution of the individual digital files FN1 and FN2 and/or FN3 and/or FN3-CORR can be identical or not. In fact, when the resolution of two digital files is identical, this enables comparisons and/or corrections to be made directly on the said files without having to carry out prior pre-processing. When the resolution of the digital files is not identical, the digital files are generally subject to pre-processing in such a way that the resolution and hence the size of the files on which the comparison and/or correction is carried out are the same.

Figure 2:
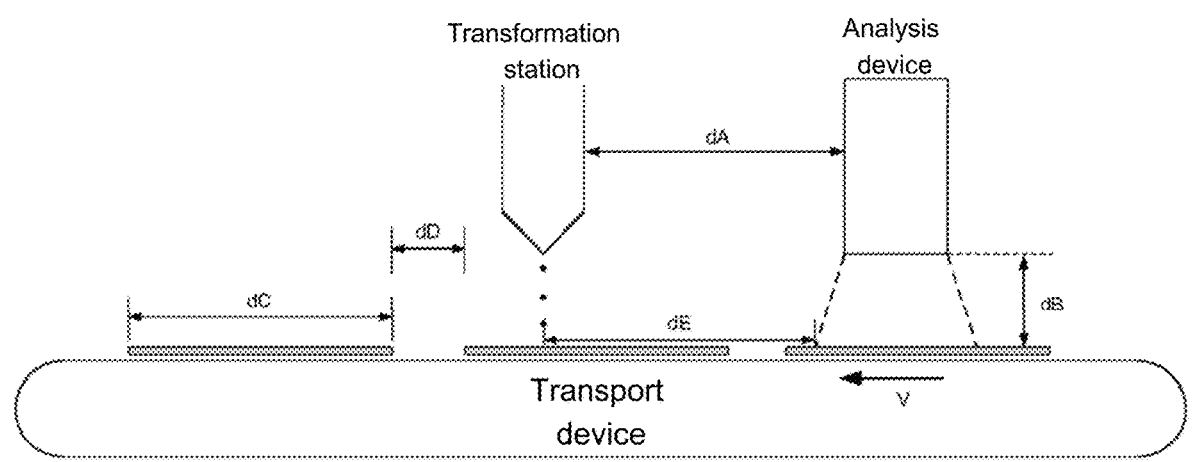
FIG. 2 illustrates a transformation device in conformity with the present invention.

As a non-limiting illustration, FIG. 2 illustrates a transformation device in conformity with the present invention. There are shown the transformation station (for example a printing system), the X device (illustrated by the "analysis device", for example a scanner) and the conveying station (illustrated by the "conveying device", for example a belt). In this embodiment example, the substrate of length dC is conveyed in the transformation device from right to left, respectively under the analysis device and under the transformation station. The present invention may advantageously be used for all types of substrate of length dC, however great or small this length; as a non-limiting example, the length dC will be less than 2,200 mm. In particular, the substrate format may be selected from among the formats meeting an international (ISO) and/or national standard (DIN, AFNOR, ANSI, etc.). As an illustration we may cite the French and/or American standards. The present invention may also prove very useful for substrates of the roll type; in this particular case, the "length dC" may correspond to the length of any roll or to the length (in the direction of feed of the roll) of the part of the roll corresponding to the transformation characteristic (for example, printing) which can be repeated on the roll.

In FIG. 2, the distance dB is the distance between the upper part of the substrate and the lower part of the X device (illustrated by the "analysis device"). In a specific embodiment, the distance dB is less than 10 meters, than 2 meters, than 500 millimeters, preferably less than 300 millimeters, or even less than 100 millimeters. In FIG. 2, the distance dA is the distance between the transformation station and the X device (illustrated by the "analysis device"). In a specific embodiment, the distance dA is less than 50 m, preferably less than 20 m, preferably less than 10 m, preferably less than 5 m.

In FIG. 2, the distance dE is the distance between the point on the substrate which at time t undergoes the transformation in the transformation station (illustrated by the "transformation station") and the point upstream of the analysis and acquisition zone at the same time "t" of the X device (illustrated by the "analysis device"). In a specific embodiment, the distance dE is equal to or greater than 0 mm, greater than 1 mm, greater than 50 mm, for example greater than 100 mm, greater than 250 mm or greater than 300 mm or greater than 500 mm or greater than 1000 mm or greater than 10,000 mm. In a specific embodiment, the distance dE is less than 100 m, less than 50 m or less than 20 m.

In FIG. 2, the distance dD is the distance between two successive substrates. In a specific embodiment of the present invention, the distance dD is greater than 1 mm, greater than 5 mm, than 20 mm, or than 50 mm. In a specific embodiment, the distance dD is less than 1000 mm, than 500 mm, or than 200 mm. For a roll substrate, this distance can be zero.

In a specific embodiment of the present invention, the relative speed of the substrate (illustrated by the movement of the substrate and the symbol "V" in FIG. 2) relative to the training station (illustrated by the "transformation station") and/or relative to the X device (illustrated by the "analysis device") is between 0.05 and 10 m/s, between 0.1 and 2 m/s, for example, between 0.3 and 1.2 m/s; the relative speed of the substrate relative to the transformation station and the speed relative to the X device may be different or identical.

The present application describes various technical characteristics and advantages with reference to the figure and/or to various embodiments. Those skilled in the art will understand that the technical characteristics of a given embodiment may in fact be combined with the characteristics of another embodiment unless the contrary is explicitly mentioned or it is obvious that these characteristics are incompatible. Furthermore, the technical characteristics described in an embodiment may be isolated from the other characteristics of this embodiment unless the contrary is explicitly mentioned.

Thus, according to a specific embodiment of the present invention, it is possible to add any type of optional and/or additional processing of the substrate upstream of the X device, between the X device and the transformation station and/or downstream of the transformation station.

It should be obvious to those skilled in the art that the present invention enables embodiments under numerous other specific forms without leaving the field of application of the invention as claimed. Consequently, the present embodiments must be considered as illustrations, but may be modified in the defined field by the scope of the attached claims, and the invention must not be limited to the details given above.

The invention claimed is:

1. A method in a transformation device for printing on a pre-processed substrate by digital processing comprising:
    a step for printing by digital processing of a pre-processed substrate in a transformation station of the transformation device,
    a step for the control of the transformation station by a means of control,
    a recording step in the means of control of a digital source FN1 file representing the pre-processed substrate,
    a recording step in the means of control of a digital FN3 file representing the printing to carry out on the pre-processed substrate by digital processing,
    a step for the analysis of the pre-processed substrate by means of a X device in order to assign numerical values to it, the said X device configured to capture image data representing a surface of the pre-processed substrate and assign numerical values based on the image data, the said X device being located in the transformation device, a recording step in the means of control of a digital FN2 file representing the pre-processed substrate analyzed by means of the X device and the acquisition of the corresponding digital data, a step for comparison and recording in the means of control of the differences between the FN1 file and the FN2 file, a step for the correction, by a means of correction that is part of the means of control, of the FN3 file by the differences between the FN1 file and the FN2 file, and a recording step in the means of control of a digital FN3-CORR file supplied by the means of correction of the FN3 file, the step for printing by digital processing of the pre-processed substrate in a transformation station being the last step, the said last step being controlled by the means of control by means of the FN3-CORR file;

wherein the distance dE which corresponds to the distance between that point on the pre-processed substrate that at time "t" undergoes the printing in the transformation station and the point upstream of the analysis and acquisition zone at the same time "t" of the X device is greater than 1 mm.

2. Method according to claim 1 wherein it includes a subdividing step by a means of subdividing the FN1 and FN2 files.

3. Method according to claim 2 wherein the subdividing is carried out in successive transverse strips of the pre-processed substrate.

4. Method according to claim 3 wherein the strips are of dimensions equal in length to or greater in length than the width of the pre-processed substrate and of width greater than 0.01 cm.

5. Method according to claim 3 wherein the strips are of dimensions equal in length to (or greater in length than) the width of the pre-processed substrate and of width less than 100 cm.

6. Method according to claim 3 wherein the printing of the first strips of the pre-processed substrate begins while part of the said pre-processed substrate has not yet been analyzed by means of the X device.

7. Method according to claim 1 wherein the distance dE is less than 100 m.

8. Method according to claim 1 wherein the control station includes a parallelizable calculation/processing unit that acts as a means of subdividing the FN1 and FN2 files, a means of comparing and recording the differences between the FN1 file and the FN2 file, and a means of correcting the FN3 file by the differences between the FN1 file and the FN2 file.

9. Method according to claim 1 wherein the pre-processed substrate is pre-processed in a pre-processing device selected from among printing of an image or text, a pasting of an image or text, a filming, a pre-cutting, a perforation, or two or more combinations of the said pre-processing.

10. Method according to claim 1 wherein the pre-processed substrate does not contain registration marks at pre-determined places before printing.

11. Method according to claim 1 wherein the speed of the pre-processed substrate ("v") relative to the transformation station is between 0.05 and 10 m/s.

12. Method according to claim 1 wherein the speed of the pre-processed substrate ("v") relative to the X device is between 0.05 and 10 m/s.

13. Method according to claim 1 wherein the digital files FN1 and FN2 are processed before or during their comparison in such a way that their resolution is identical.

14. Method according to claim 13 wherein the digital FN3 file is processed before being corrected in such a way that its resolution is identical to that of the processed FN1 and FN2 files.

15. Method according to claim 1 wherein there is a relative movement of the pre-processed substrate with respect to the transformation device, said relative movement being generated either by means of a conveying station which moves the pre-processed substrate through the transformation station, or by means of a movable transformation station whilst the substrate remains immobile, or both by a movable transformation station and a conveying station.

16. A device for transforming a pre-processed substrate by digital processing comprising:

a transformation station for at least one of printing on or cutting a pre-processed substrate by digital processing, a control station controlling in particular the transformation station, a digital source FN1 file representing the pre-processed substrate, a digital FN3 file representing the at least one of printing on or cutting to perform on the pre-processed substrate, a substrate analysis X device configured to capture image data representing a surface of the pre-processed substrate and to assign numerical values based on the image data, a digital FN2 file representing the pre-processed substrate analyzed by means of the X device and the acquisition of the corresponding digital data, wherein:

the control station contains the digital files FN1, FN2 and FN3 together with:

a means of comparing and recording the differences between the FN1 file and the FN2 file, a means of correcting the FN3 file by the differences between the FN1 file and the FN2 file, and a digital FN3-CORR file supplied by the means for correcting the FN3 file and which replaces the FN3 file for performing the at least one of printing on or cutting of the pre-processed substrate, wherein the distance dE which corresponds to the distance between that point on the pre-processed substrate that at time "t" undergoes the at least one of printing on or cutting in the transformation station and the point upstream of the analysis and acquisition zone at the same time "t" of the X device is greater than 1 mm.

17. A method in a transformation device for cutting a pre-processed substrate by digital processing comprising:

a step for cutting by digital processing of a pre-processed substrate in a transformation station of the transformation device, a step for the control of the transformation station by a means of control, a recording step in the means of control of a digital source FN1 file representing the pre-processed substrate, a recording step in the means of control of a digital FN3 file representing the cutting to carry out on the pre-processed substrate by digital processing, a step for the analysis of the pre-processed substrate by means of a X device in order to assign numerical values to it, the said X device configured to capture image data representing a surface of the pre-processed substrate and assign numerical values based on the image data, the said X device being located in the transformation device, a recording step in the means of control of a digital FN2 file representing the pre-processed substrate analyzed by means of the X device and the acquisition of the corresponding digital data, a step for comparison and recording in the means of control of the differences between the FN1 file and the FN2 file, a step for the correction, by a means of correction that is part of the means of control, of the FN3 file by the differences between the FN1 file and the FN2 file, and a recording step in the means of control of a digital FN3-CORR file supplied by the means of correction of the FN3 file, the step for cutting by digital processing of the pre-processed substrate in a transformation station being the last step, the said last step being controlled by the means of control by means of the FN3-CORR file;

wherein the distance dE which corresponds to the distance between that point on the pre-processed substrate that at time "t" undergoes the cutting in the transformation station and the point upstream of the analysis and acquisition zone at the same time "t" of the X device is greater than 1 mm.

\* \* \* \* \*